May 2, 1961           D. A. LACE           2,982,179

ELECTRO-MAGNET REFLECTING DEVICE AND MOTOR THEREFOR

Filed April 18, 1952           2 Sheets-Sheet 1

INVENTOR.
DONALD ALLEN LACE

BY Nicholas M. Esser

ATTORNEY

May 2, 1961  D. A. LACE  2,982,179
ELECTRO-MAGNET REFLECTING DEVICE AND MOTOR THEREFOR
Filed April 18, 1952  2 Sheets-Sheet 2
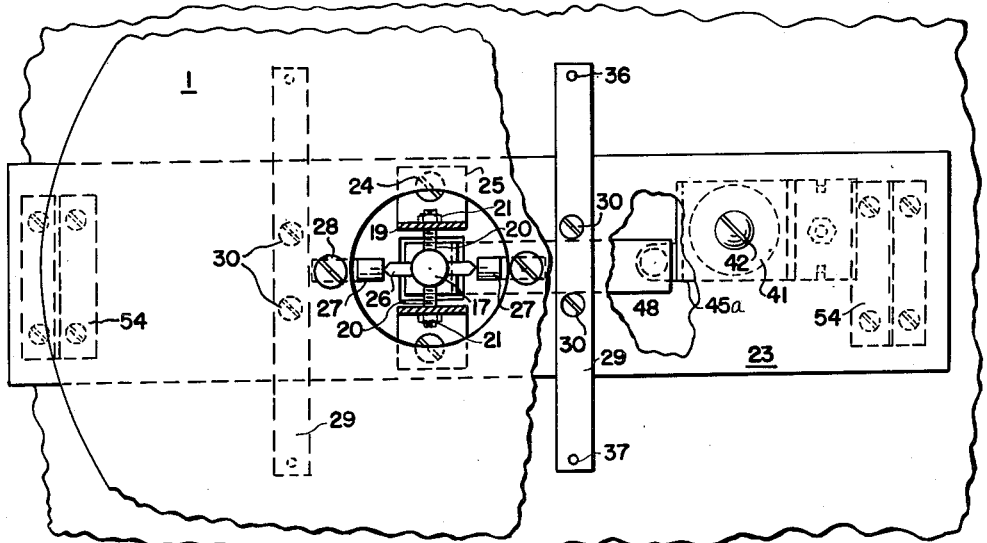
FIG. 5
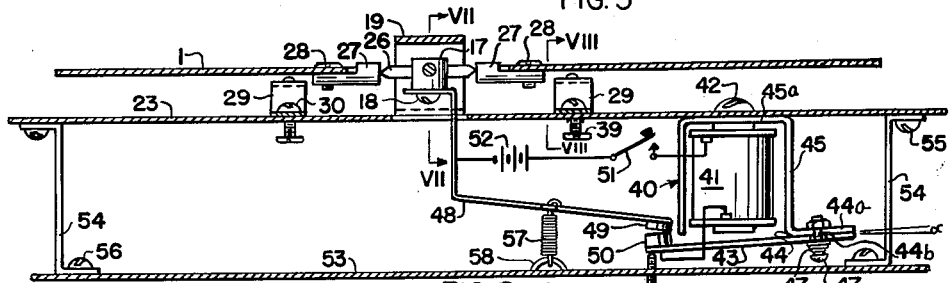
FIG. 6
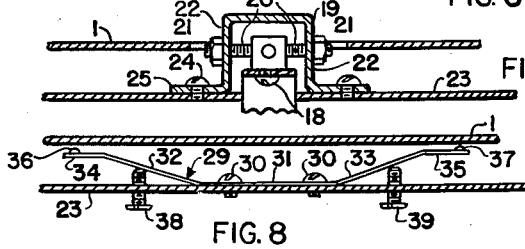
FIG. 7
FIG. 8
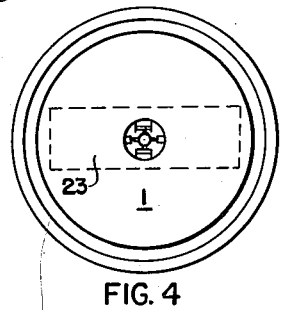
FIG. 4
*INVENTOR.*
DONALD ALLEN LACE
BY Nicholas M. Esser
ATTORNEY

United States Patent Office 2,982,179
Patented May 2, 1961

2,982,179
ELECTRO-MAGNET REFLECTING DEVICE AND MOTOR THEREFOR
Donald Allen Lace, 4209 W. Cortez St., Chicago, Ill.
Filed Apr. 18, 1952, Ser. No. 283,079
9 Claims. (Cl. 88—92)

This invention relates to light reflectors and more particularly to light reflectors which are movable by means of an electro-mechanical device.

An object of this invention is to provide a light reflector which is movable through a series of planes or paths causing the rays of light to be reflected in a plurality of diverging directions to obtain maximum visibility thereof.

Another object of this invention is to provide an electro-mechanical means for readily moving, oscillating, sweeping, scanning, or randomly moving the reflector through said series of planes or paths and which means is operable with a minimum current consumption.

A further object in accordance therewith resides in the provision of a compact unit with the feasibility of a self-contained power source, although an outside power source could as readily be utilized.

A still further object of the invention resides in the simplicity, rugged dependability, and relatively low cost of manufacture of the movable reflecting devices and electro-mechanical driving devices.

These and other objects and advantages of the invention reside in the novel combination and arrangement of the various parts thereof and will become more fully apparent from a perusal of the ensuing specification taken in conjunction with the accompanying drawings in which:

Figure 4 is a front elevational view of a third embodiment of the instant invention wherein the reflector is pivotal about both horizontal and vertical axes.

Figure 5 is an enlarged partial view of Fig. 4 partly broken away to show details of structure.

Figure 6 is a central cross-sectional view of Fig. 5.

Figures 7 and 8 are enlarged sectional views taken along lines VII—VII and VIII—VIII of Fig. 6.

Figure 1:
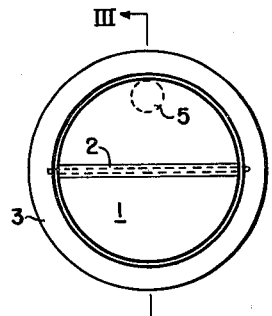
Figure 1 is a front elevational view of a first embodiment of a reflector in accordance with the invention, said reflector being pivotal about a horizontal axis.
Figure 2:
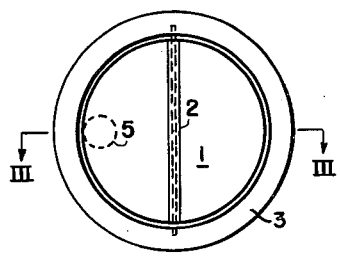
Figure 2 is a front elevational view of a similar reflector pivotal about a vertical axis and constituting the second embodiment of the instant invention.
Figure 3:
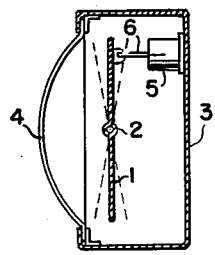
Figure 3 is a section view taken on lines III—III of Figs. 1 and 2, respectively.
Figure 11:
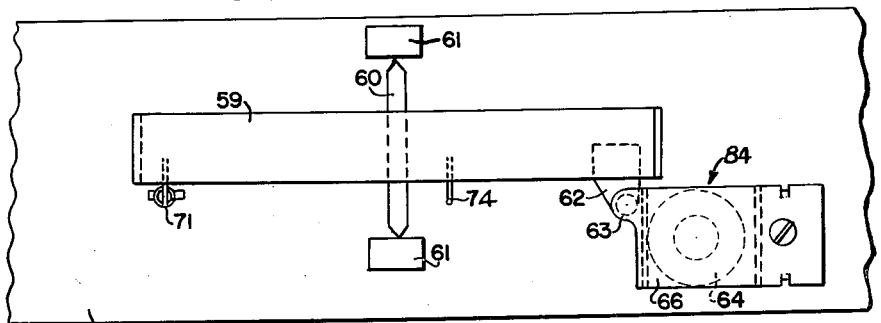
Figure 11 is a plan view of an embodiment of the electro-mechanical device for moving the reflectors, and shown in block in Figs. 3 and 10.
Figure 12:
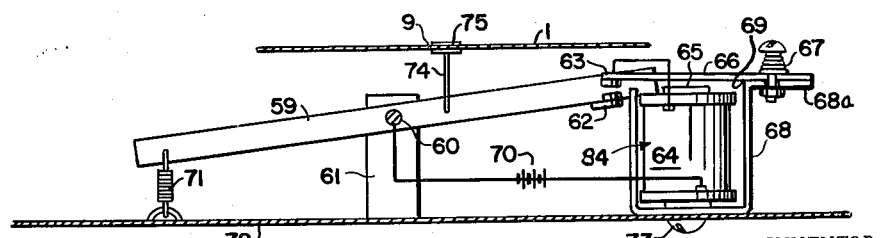
Figure 12 is a central cross-sectional view of the electro-mechanical means or motor shown in Fig. 11.

Figs. 1, 2, and 3 disclose two closely related embodiments of the invention wherein a flat circular reflector 1 is mounted in a housing 3 about a pivotal axis 2, said housing 3 being provided with a suitable lens 4. Although only flat reflector surfaces have been shown for simplicity, multi-surfaced reflectors are equally contemplated as within the scope of the invention hereinafter defined. An oscillating motion is imparted to the reflector 1 by means of a movable element 6 connected to an electro-mechanical means or motor 5, more particularly hereinafter described with relation to Figs. 11 and 12. The reflector 1 is pivoted in either a horizontal or a vertical plane depending upon the position of the pivotal axis 2 in housing 3. Light rays from vehicle headlights or the like, or any other external source for that matter, will be caught by the reflector 1 as it moves through either its horizontal or vertical sweep as the case may be and will be reflected back into the path of the oncoming vehicle or light source where the same will be viewable. The reflector 1 is preferably made of a piece of highly reflective material such as bright, polished metal, or the like.

In Fig. 5 there is shown an embodiment wherein the pivotal axes 2 of the reflectors disclosed in Figs. 1, 2, and 3 are combined so that the reflector thereof is pivotal about both said axes. This dual pivotal arrangement consists of a stud 17 internally threaded to receive a screw 18. The stud 17 is pivotally connected to a yoke 19 by means of oppositely positioned pivot pins 20 secured thereto by nuts 21 immediately adjacent the side walls 22 of the member 19. The yoke 19 is fixedly connected to a support plate 23 by means of screws 24 passing through lips 25 of yoke member 19 bent outwardly at right angles to the side walls 22. The stud 17 is also provided with a second set or pair of pivot pins 26 extending approximately 90° from the pivot pins 20 and journalled to bearing blocks 27 secured to the reflector 1 by means of screws 28. In this embodiment, the circular reflector 1 is provided with a central aperture through which the yoke member 19 extends.

A random movement of the reflector 1 pivoting about both its horizontal and vertical axes is accomplished by means of two leaf springs 29 mounted on support plate 23 on parallel lines spaced from the center thereof. Springs 29 are centrally connected to the plate 23 by screws 30. Intermediate portions 32 and 33 are bent in such a manner as to provide inclined upwardly extending arms terminating in end portions 34 and 35 bent substantially parallel to the center portions 31 secured to plate 23. The end portions 34 and 25 of the springs 29 are equipped with nodules 36 and 37 which provide points for contact with the under side of the reflector 1. The angle through which the reflector will move is determined by the inclination of the springs 29, which inclination is adjustable by threaded spacer elements or screws 38 and 39 extending upwardly through tapped holes in the plate 23 and bearing against the under side of intermediate portions 32 and 33 of the springs 29. If a greater angle of movement of the reflector 1 is desired, the spacer elements or screws 38, 39 are turned downwardly thus lowering spring portions 32 and 33. This then permits the reflector 1 to move through a greater arc before another portion of the reflector strikes another contact point thus changing the direction of the swing or sweep and starting the movement of the reflector 1 in another sweep.

Intermittent motivation for stud 17 is provided by an electro-magnetically driven motor 40. Motor 40 comprises a coil 41 suspended within a magnetic yoke 45 depending from support plate 23 by screw means 42 and having an armature 43 pivoted about a fulcrum axis 44 at the line of juncture of one end of magnetic yoke 45 and a lip 44a extending therefrom at an angle α from the base portion 45a of said yoke. The angle α may be from 1° to 5°. The lateral edges of lip 44a are provided with downwardly bent integral fingers 44b extending into registering but slightly wider slots in armature 43. Armature 43 is normally biased away from the other end of magnetic yoke 45 and core 46 of coil 41 by means of a suitable tension spring 47 held between the head of a screw 47a and the armature 43. Screw 47a is loosely fitted through registering holes of larger diameter in armature 43 and lip 44a between fingers 44b and corresponding notches. Screw 47a is then held by a nut on the other side of lip 44a. Instead of a nut, the hole in lip 44a could be suitably tapped. A Z-shaped arm 48 is connected at one end to stud 17 by screw 18 and is provided adjacent its other end with an electrical contact 49 for contacting a corresponding contact 50 on the under side of armature 43 on the end thereof opposite the end having the tension spring 47.

A tension spring 57, one end of which is connected to a hook 58 on a second support plate 53, is connected to Z-shaped arm 48 thereby biasing arm 48 so that contacts 49 and 50 are normally made. The plates 23 and 53 are held in spaced relationship by means of spacer bars 54, one end of which is bent at substantially a right angle inwardly, the other end being bent at substantially a right angle outwardly. The upper ends of bars 54 are connected to plate 23 by means of screws 55 while the lower ends of the bars 54 are connected to plate 53 by means of screws 56.

A simple schematic circuit is shown in Fig. 6 so that when switch 51 is closed to set the reflector in motion, current from battery 52 is sent through coil 41, contacts 49 and 50, arm 48 and back to the battery. Coil 41 energizes thereby pulling up armature 43 about its fulcrum 44 kicking arm 48 via contact 49 which motion is transmitted via stud 17 through pivot pins 26 to reflector 1. The inertia of the mass of reflector 1 then carries contact 49 and arm 48 farther, thus breaking the contact between contacts 49 and 50 causing coil 41 to de-energize. Upon de-energization of coil 41, tension spring 47 drives the armature 43 oppositely about fulcrum axis 44 downwardly to rest position for the next cyclic operation. Obviously, the break contacts 49 and 50 as shown could readily be arranged as make contacts by a suitable change of position of arm 48 if so desired. Spring 57 serves to bias arm 48 to close the contacts 49 and 50 to energize coil 41 for the next cyclic operation. In this manner the circuit operates self-interrupted intermittently kicking the arm 48 to give continued impetus to the reflector 1.

Beween impulses or kicks, the reflector 1 is scanned randomly from spring contact to spring contact 36, 37. However, the reflector 1 can also be made to sweep in a predetermined pattern by suitable adjustment of springs 29 by means of adjusting screws 38 and 39.

The travel of armature 43 is mechanically limited by means of adjustable screw 76 thereby changing the direction of the reflector without the use of springs 29 in a particular instance.

It is obvious further that although a battery 52 has been shown, an outside source of current could be employed. However, by use of a self-contained battery, such as a pair of flashlight batteries, the device, because of its extremely low current consumption, can operate for extensive periods of time. Low current consumption is partially due to the fact that the contacts 49 and 50 make for only a minutely small fraction of the total time of one cycle. During the remaining portion of the cycle the reflector 1 bounces or scans from flat leaf spring 29 to flat leaf spring 29 or from limit screw 76, the intermittent kicks from the relay being just sufficient to maintain the continuous scanning operation.

The major reason for the low current consumption, however, resides in the mechanical construction of the motor and the advantage obtained thereby. The spring 47 is positioned closer to the fulcrum axis 44 than to the end of lip 44a and adjacent end of armature 43. The outer ends of lip 44a and armature 43 would provide a second fulcrum but for the limit or stop screw 76 employed in this embodiment. Because the distance between the applied force of spring 47 and the fulcrum axis 44 is small, it is easy for coil 41 upon energization to overcome the tension of spring 47, and accordingly a coil of low current consumption can be utilized. There remains, however, sufficient spring tension to restore the armature and to overcome any tendency of the armature to stick to the free end of the magnetic yoke member 45 due to residual magnetism after the energizing circuit is broken.

The construction further provides a completely closed magnetic circuit when the coil is energized so that notwithstanding the small current draw, the relay operates with a sharp snap imparting a goodly thrust to arm 48. At this point it is also to be noted that back stop 76 serves in certain positions of scan to permit contact 49 to bound off the thusly backed contact 50 anvil fashion thus breaking contacts 49 and 50 at times even before armature 43 can complete its full travel.

Figure 9:
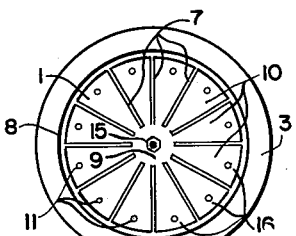
Figure 9 is a front elevational view of a fourth embodiment of the invention.
Figure 10:
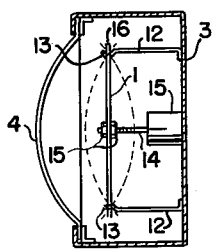
Figure 10 is a central cross-sectional view of Fig. 9.

Figs. 9 and 10 show a further modification of a flexible reflector 1 enclosed by a housing 3 and a lens 4 in like manner. However, the reflector 1 in this instance is provided with a series of slits 7 extending radially inwardly from the periphery 8 of the reflector 1 towards its center 9, but terminating short thereof, thereby forming individual segments 10. Each segment is provided with an aperture 11 inwardly of the periphery 8 into which stationary connecting rods 12 connected to the base or housing 3 are positioned by means of hooks 13 fashioned in the free ends of said rods 12. To the center of the reflector 1 a movable rod 14 is connected, said rod being firmly connected thereto by means of nuts 15 threaded on rod 14 on both the front and rear faces of the reflector 1. The other end of rod 14 is connected to the electro-mechanical device or motor means 5. Upon excitation of the motor means 5, the rod 14 will oscillate in a horizontal direction towards and away from the motor thereby causing the reflector 1 to flex and change shape, the reflector passing from a concave form, to flat, to a convex form and back again completing a cycle. It is to be noted that the ends 16 of the segments 10 which lie outwardly beyond the holes 11 do not change form as do the inner portions of said segments, but remain substantially flat and act only as plane mirrors rather than focusable as is the case with respect to the concavo-convex portions.

The motivating means for this reflector is similar to the motor means shown in Fig. 6 but includes an electrically conductive counterbalancing weight 59. Weight 59 is mounted for pivotal movement about pin 60 which in turn is journalled in bearings mounted on a support plate 72. Electro-magnetic motor means 84 comprises a coil 64 within a magnetic yoke 68, both firmly secured to plate 72 by means of a screw 73. An armature 66 for coil 64 is pivotal about a first pivot or fulcrum axis 69 which defines the line of juncture between an extension or lip 68a and the adjacent end of yoke 68. Lip 68a extends at an angle $\alpha$ with respect to the base of yoke 68, angle $\alpha$ being from 1° to 5°. The fulcrum end of armature 66 is biased in its rest position away from coil 64 and core 65 by means of a tension spring 67. The manner in which the armature is mounted to lip 68a is the same as described with reference to Fig. 6 and will not be repeated. However, since no mechanical stop is provided, the outer ends of lip 68a and armature 66 provide a second fulcrum axis. The end of armature 66 is provided with an electrical contact 63. The counter-balancing weight 59 is also provided with an electrical contact 62 adjacent one end thereof, said contact extending outwardly from one side of the weight and arranged to register with contact 63. The end of weight 59 opposite the end provided with contact 62 is connected to another tension spring 71 which is in turn connected to plate 72. Spring 71 biases weight 59 so that contacts 62 and 63 normally are in contact with one another. Weight 59 is connected to reflector 1 by means of a connecting rod 74 connected to the center of reflector 1 by suitable means 75.

When a switch, not shown, is closed, current flows from a battery 70 or other suitable current source through coil 64, contacts 62 and 63, weight 59 and back to battery. Coil 64 is energized thereby pulling armature 66 downwardly with such a force that weight 59 pivots downwardly about pin 60 to such an extent that contact between electrical contacts 62 and 63 is broken, thereby causing coil 64 to de-energize. Upon de-energization of the coil, spring 67 pulls armature 66 upwardly while spring 71 pulls the end of weight 59 downwardly thereby moving the opposite end of the weight containing the contact 62 upwardly. The reflector 1 is an integral part of the energy spring return system in this electro-mechanical oscillating device. This again closes the contacts 62 and 63 reoperating the device in the next cycle. Inasmuch as connecting rod 74 is positioned off center of weight 59, the motion of the weight will be reciprocatingly transmitted to flexible reflector 1 thereby causing the reflector to pass from a concave form, to flat, to a convex form and back again cyclically. Again here, as with reference to the motor previously described, the low current consumption is partially due to the extremely short actual time during which the contacts 62 and 63 make, said time being only a small fraction of the operating time during a single cycle.

The great efficiency of this motor, as described also with reference to Fig. 6, lies principally in the mechanical construction of the motor and the advantage gained thereby. The details of the connection of the armature to the lip are substantially the same as described hereinbefore and will not be repeated. However, there exists here one notable difference increasing the efficiency thereover. As no back stop member is provided to limit restoring movement of the armature, the counterweight 59 in coming back up under the bias of its spring 71, drives armature 66 back about its outward or second fulcrum axis so that in this position, as the coil energizes from the making of contacts 62 and 63, the armature spring 67 aids the coil in thrusting the armature downwardly to again kick the counterweight. Thus again, a lesser current is necessary to achieve the desired object due to the mechanical aid of the energy spring return system provided.

The foregoing description is directed solely to the constructions shown, but it is understood that modifications may be made in the construction and embodiment of the invention without departing from the spirit and scope of the invention.

Having described what is considered to be a preferred embodiment of the invention, what is claimed and desired to be protected by Letters Patent of the United States is:

1. In a light reflector, a flexible reflecting surface having a plurality of slits extending inwardly from the periphery thereof, a base, means positioned outwardly from the center of said surface for securing said reflecting surface to said base, and reciprocating means including an electromagnetic device connected centrally of said reflecting surface for flexing at least a portion of said reflecting surface.

2. In a light reflector, a flexible reflecting surface having radial slits extending inwardly from the periphery thereof toward the center, a base, means outwardly from the center of said surface for securing it to said base, and means including a reciprocating electro-magnetic device connected to the center of said reflecting surface for flexing at least a portion of said reflector cyclically from concave to convex to concave.

3. In a light reflector, a housing, a flexible reflecting surface having radial slits extending inwardly from the periphery thereof toward but short of the center to form individual segments thereof, each segment being provided with an aperture toward its outer end, means fixed to said housing and pivotally connected through said aperture to mount said reflecting surface, electro-magnetic reciprocating means mounted within said housing and connected to the center of said reflecting surface for cyclically moving at least portions of said reflector segments from concave to convex to concave shape, and a lens for said reflecting surface mounted on said housing adjacent said reflecting surface.

4. In a light reflector, a flexible reflecting surface having radial slits extending inwardly from the periphery thereof toward the center, a base, means outwardly from the center of said surface for securing it to said base, and means including a reciprocating electro-magnetic device connected to the center of said reflecting surface for flexing at least a portion of said surface cyclically from concave to convex to concave, said electro-magnetic device comprising a magnet, a magnetic yoke and an armature having a pair of fulcrum axes, a counterbalancing weight pivotally mounted with one end adjacent said armature, said armature upon energization pivoting about one of said fulcrum axes kicking said weight about its pivotal axis, means causing said weight at times to pivot said armature about the other of its fulcrum axes, and a self-interrupting circuit for intermittently operating said weight.

5. In a light reflector as claimed in claim 4, in which said reflecting surface is connected to said counterbalancing weight off center from the pivotal axis of said weight.

6. In a light reflector as claimed in claim 4, including spring means movably connecting said armature to said magnetic yoke and biasing said armature for its movement about said fulcrum axes thereof.

7. In a light reflector as claimed in claim 4, including a biasing spring for said counterbalancing weight cooperating with said armature connecting spring means.

8. In a light reflector, a flexible reflecting surface having radial slits extending inwardly from the periphery thereof toward the center, a base, means outwardly from the center of said surface for securing it to said base, means including a reciprocating electromagnetic device connected to the center of said reflecting surface for flexing said surface cyclically from concave to convex to concave shape, said electro-magnetic device comprising a magnet having an armature and a counterbalancing weight pivotally mounted with one end adjacent said armature, said armature upon energization kicking said weight about its pivotal axis, and a self-interrupting circuit for intermittently operating said magnet, said self-interrupting circuit including a portion of said counterbalancing weight and a pair of contacts on the adjacent ends of said armature and weight.

9. In a light reflector as claimed in claim 8, including a self-contained power source for said circuit.

References Cited in the file of this patent

UNITED STATES PATENTS

| | | |
|---|---|---|
| 408,511 | O'Brien | Aug. 6, 1889 |
| 707,982 | Taylor | Aug. 26, 1902 |
| 840,084 | Muller | Jan. 1, 1907 |
| 1,016,500 | Hinz | Feb. 6, 1912 |
| 1,321,443 | Horton | Nov. 11, 1919 |
| 1,548,958 | Sperry | Aug. 11, 1925 |
| 1,594,748 | Neave | Aug. 3, 1926 |
| 1,647,858 | Dunham | Nov. 1, 1927 |
| 1,857,736 | Morrison | May 10, 1932 |
| 1,910,119 | Moats | May 23, 1933 |
| 1,913,874 | Folberth | June 13, 1933 |
| 2,049,843 | Lee | Aug. 4, 1936 |
| 2,129,017 | Luce | Sept. 6, 1938 |
| 2,153,448 | Boaz | Apr. 4, 1939 |
| 2,226,159 | de Hoffman | Dec. 24, 1940 |
| 2,336,451 | Allen | Dec. 14, 1943 |
| 2,403,915 | Evans | July 16, 1946 |
| 2,456,362 | Aves | Dec. 14, 1948 |
| 2,456,777 | Gibson | Dec. 21, 1948 |
| 2,457,868 | Chiesa | Jan. 4, 1949 |
| 2,493,112 | Cristopher | Jan. 3, 1950 |
| 2,503,509 | Rader | Apr. 11, 1950 |
| 2,504,386 | Brady et al. | Apr. 18, 1950 |
| 2,504,387 | Pruellage | Apr. 18, 1950 |
| 2,567,324 | Davis | Sept. 11, 1951 |
| 2,599,005 | Macgeorge et al. | June 3, 1952 |
| 2,638,035 | Macgeorge et al. | May 12, 1953 |
| 2,664,785 | Roehrig | Jan. 5, 1954 |

FOREIGN PATENTS

| | | |
|---|---|---|
| 549,332 | Germany | Apr. 26, 1932 |